US012683439B2

(12) United States Patent
Momen et al.

(10) Patent No.: US 12,683,439 B2
(45) Date of Patent: Jul. 14, 2026

(54) MIXED BAR AND WIRE CONDUCTOR COMBINATIONS FOR STATORS OF HIGH-SPEED ELECTRIC MOTORS

(71) Applicant: GM GLOBAL TECHNOLOGY OPERATIONS LLC, Detroit, MI (US)

(72) Inventors: Mohammad F. Momen, Rochester Hills, MI (US); Mazharul Chowdhury, Canton, MI (US); Alexander Forsyth, Windsor (CA); Yilun Luo, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 402 days.

(21) Appl. No.: 18/483,181

(22) Filed: Oct. 9, 2023

(65) Prior Publication Data

US 2025/0119002 A1     Apr. 10, 2025

(51) Int. Cl.
| | |
|---|---|
| *H02K 1/16* | (2006.01) |
| *H02K 3/12* | (2006.01) |
| *H02K 7/00* | (2006.01) |
| *B60K 1/00* | (2006.01) |
| *H02K 11/33* | (2016.01) |
| *H02K 15/028* | (2025.01) |

(52) U.S. Cl.
CPC .............. *H02K 1/165* (2013.01); *H02K 3/12* (2013.01); *H02K 7/006* (2013.01); *B60K 1/00* (2013.01); *H02K 11/33* (2016.01); *H02K 15/028* (2013.01)

(58) Field of Classification Search
CPC .......... H02K 1/148; H02K 1/16; H02K 1/165; H02K 2213/03; H02K 3/12; H02K 7/006; H02K 11/33; B60K 1/00

USPC ......................................................... 310/201
See application file for complete search history.

(56) References Cited

U.S. PATENT DOCUMENTS

| | | | |
|---|---|---|---|
| 2,990,508 | A | 6/1961 | Thompson |
| 3,860,744 | A * | 1/1975 | Schuler .................... H02K 3/34 |
| | | | 174/117 FF |
| 5,166,568 | A | 11/1992 | Nystuen et al. |
| 6,163,127 | A | 12/2000 | Patel et al. |
| 6,278,213 | B1 * | 8/2001 | Bradfield ............... H02K 1/165 |
| | | | 310/216.069 |

(Continued)

FOREIGN PATENT DOCUMENTS

WO          2015162586 A2    10/2015

*Primary Examiner* — Maged M Almawri
(74) *Attorney, Agent, or Firm* — Quinn IP Law

(57)          ABSTRACT

Presented are electric machines with both bar and wire conductors, methods for making/using such machines, and vehicles equipped with such machines. An electric machine, such as a traction motor or electric generator, includes an outer housing, a stator fixedly mounted to the housing, and a rotor movably mounted to the housing and spaced across an airgap from the stator. Multiple magnets, such as permanent magnet blocks, are mounted on or in slots of the rotor (or the stator). A set of electromagnetic conductors extends through each radially elongated slot of the stator (or the rotor). Each conductor set includes a group of solid-wire or multistrand-wire conductors that is located adjacent the airgap. A group of hairpin or I-pin bar conductors is radially spaced from the airgap and located adjacent the wire conductors. The bar conductors have a cross-sectional area/shape that is distinct from a cross-sectional area/shape of the wire conductors.

20 Claims, 4 Drawing Sheets

(56) References Cited

U.S. PATENT DOCUMENTS

| | | | | |
|---|---|---|---|---|
| 6,404,092 | B1* | 6/2002 | Baumann | H02K 15/12 |
| | | | | 310/201 |
| 6,548,933 | B2* | 4/2003 | Yasuhara | H02K 3/505 |
| | | | | 310/206 |
| 6,664,695 | B2* | 12/2003 | Asao | H02K 3/12 |
| | | | | 29/605 |
| 6,674,205 | B2 | 1/2004 | Biais et al. | |
| 7,194,794 | B2* | 3/2007 | Arendes | H02K 15/06 |
| | | | | 29/598 |
| 7,928,626 | B2* | 4/2011 | Kamibayashi | H02K 1/165 |
| | | | | 310/201 |
| 7,969,058 | B2 | 6/2011 | Rahman et al. | |
| 8,058,765 | B2* | 11/2011 | Rahman | H02K 3/12 |
| | | | | 310/216.069 |
| 8,120,223 | B2 | 2/2012 | Leonardi et al. | |
| 8,138,651 | B2 | 3/2012 | Rahman et al. | |
| 8,174,158 | B2 | 5/2012 | Rahman et al. | |
| 8,866,361 | B2* | 10/2014 | Savagian | H02K 3/12 |
| | | | | 310/201 |
| 8,928,197 | B2 | 1/2015 | Jurkovic et al. | |
| 8,933,606 | B2 | 1/2015 | Rahman et al. | |
| 9,035,522 | B2 | 5/2015 | Liang et al. | |
| 9,035,523 | B2* | 5/2015 | Podack | H02K 15/0421 |
| | | | | 310/201 |
| 9,712,005 | B2 | 7/2017 | Rahman et al. | |
| 11,323,001 | B2 | 5/2022 | Nehl et al. | |
| 11,482,913 | B2* | 10/2022 | Sumi | H02K 15/022 |
| 2003/0164248 | A1* | 9/2003 | Kulig | H02K 1/165 |
| | | | | 174/DIG. 20 |
| 2005/0108870 | A1* | 5/2005 | Harada | H02K 15/0414 |
| | | | | 29/606 |
| 2006/0017345 | A1 | 1/2006 | Uchida et al. | |
| 2006/0197398 | A1* | 9/2006 | Maynez | H02K 3/12 |
| | | | | 310/198 |
| 2007/0216249 | A1 | 9/2007 | Gruendel et al. | |
| 2008/0007133 | A1* | 1/2008 | Onimaru | H02K 3/14 |
| | | | | 310/201 |

| | | | | |
|---|---|---|---|---|
| 2008/0136274 | A1* | 6/2008 | Fujii | H02K 3/12 |
| | | | | 310/201 |
| 2008/0136281 | A1* | 6/2008 | Fujii | H02K 1/2766 |
| | | | | 310/156.08 |
| 2008/0136284 | A1* | 6/2008 | Fujii | H02K 3/12 |
| | | | | 310/214 |
| 2009/0045688 | A1 | 2/2009 | Liang et al. | |
| 2010/0019589 | A1* | 1/2010 | Saban | H02K 5/1285 |
| | | | | 310/216.069 |
| 2010/0244610 | A1 | 9/2010 | Hao et al. | |
| 2011/0062902 | A1 | 3/2011 | Patel et al. | |
| 2011/0109180 | A1 | 5/2011 | Akutsu et al. | |
| 2011/0169363 | A1 | 7/2011 | Summers et al. | |
| 2011/0198962 | A1* | 8/2011 | Tang | H02K 3/28 |
| | | | | 310/216.069 |
| 2012/0228989 | A1* | 9/2012 | Okimitsu | H02K 3/12 |
| | | | | 310/260 |
| 2013/0093280 | A1* | 4/2013 | Savagian | H02K 3/12 |
| | | | | 310/201 |
| 2013/0093281 | A1* | 4/2013 | Savagian | H02K 3/12 |
| | | | | 310/208 |
| 2013/0106232 | A1* | 5/2013 | Kobayashi | H02K 15/095 |
| | | | | 310/208 |
| 2013/0147303 | A1 | 6/2013 | Kaiser et al. | |
| 2013/0193798 | A1* | 8/2013 | Koga | H02K 15/22 |
| | | | | 310/208 |
| 2013/0270952 | A1 | 10/2013 | Jurkovic et al. | |
| 2014/0252903 | A1 | 9/2014 | Rahman et al. | |
| 2015/0188371 | A1* | 7/2015 | Kato | H02K 15/0431 |
| | | | | 310/208 |
| 2017/0302114 | A1* | 10/2017 | Chung | H02K 1/165 |
| 2020/0044497 | A1* | 2/2020 | Momen | H02K 3/12 |
| 2020/0185993 | A1* | 6/2020 | Hoerz | H02K 1/20 |
| 2020/0195071 | A1 | 6/2020 | Fatemi et al. | |
| 2020/0235621 | A1* | 7/2020 | Husain | H02K 1/16 |
| 2022/0103049 | A1* | 3/2022 | Fatemi | H02K 1/2766 |
| 2023/0208216 | A1 | 6/2023 | Momen et al. | |
| 2023/0238845 | A1* | 7/2023 | Suzuki | H02K 3/18 |
| | | | | 310/216.009 |
| 2024/0413777 | A1* | 12/2024 | Kim | H02M 7/48 |
| 2024/0421681 | A1* | 12/2024 | Fatemi | H02K 21/042 |

* cited by examiner

MIXED BAR AND WIRE CONDUCTOR COMBINATIONS FOR STATORS OF HIGH-SPEED ELECTRIC MOTORS

INTRODUCTION

The present disclosure relates generally to electric machines. More specifically, aspects of this disclosure relate to electromagnetic conductors for multi-phase, permanent magnet traction motors of hybrid-electric and full-electric vehicle powertrains.

Current production motor vehicles, such as the modern-day automobile, are originally equipped with a powertrain that operates to propel the vehicle and power the vehicle's onboard electronics. In automotive applications, for example, the vehicle powertrain is generally typified by a prime mover that delivers driving torque through an automatic or manually shifted power transmission to the vehicle's final drive system (e.g., differential, axle shafts, corner modules, road wheels, etc.). Automobiles have historically been powered by a reciprocating-piston type internal combustion engine (ICE) assembly due to its ready availability, relative light weight, and overall efficiency. Such engines include compression-ignited (CI) diesel engines, spark-ignited (SI) gasoline engines, two, four, and six-stroke architectures, and rotary engines, as some non-limiting examples. Hybrid-electric and full-electric vehicles (collectively "electric-drive vehicles"), on the other hand, utilize alternative power sources to propel the vehicle and, thus, minimize or eliminate reliance on a fossil-fuel based engine for tractive power.

A full-electric vehicle (FEV)—colloquially labeled an "electric car"—is a type of electric-drive vehicle configuration that altogether omits an internal combustion engine and attendant peripheral components from the powertrain system, relying instead on a rechargeable energy storage system (RESS) and a traction motor for vehicle propulsion. The engine assembly, fuel supply system, and exhaust system of an ICE-based vehicle are replaced with a single or multiple traction motors, rechargeable battery cells, and battery cooling and charging hardware in a battery-based FEV. Hybrid-electric vehicle (HEV) powertrains, in contrast, employ multiple sources of tractive power to propel the vehicle, most commonly operating an internal combustion engine assembly in conjunction with a battery-powered or fuel-cell-powered traction motor. Since hybrid-type, electric-drive vehicles are able to derive their power from sources other than the engine, HEV engines may be turned off, in whole or in part, while the vehicle is propelled by the electric motor(s).

SUMMARY

There are three primary types of electric machines used for traction motors in modern electric-drive vehicle powertrains: brushless direct current (BLDC) permanent magnet (PM) motors, brushless asynchronous alternating current (AC) motors, and multiphase synchronous ACPM motors. Permanent magnet motors have a number of operating characteristics that make them more attractive for use in vehicle propulsion applications when compared to their available counterparts, including high efficiency, high torque, high power densities, and a long constant-power operating range. A traction motor is an electric machine that converts electrical energy into rotational mechanical energy to propel a vehicle. Many traction motors contain a stator with multiphase electromagnetic windings, such as electrically conductive "hairpin" bars, and a rotatable rotor that bears an engineered pattern of magnets, such as surface-mounted or interior-mounted permanent magnets. PM motors may be categorized as AC or DC, rotary or linear, and radial flux or axial flux. In radial-flux PM motor designs, the magnet-bearing rotor may be coaxially nested inside the stator or may circumscribe the stator. A PM motor may also take on an axial-flux arrangement in which the stator and rotor are facing coaxial plates. Rotation of the rotor is effected by a magnetic field that is produced by current flowing through the stator windings and interacts with a magnetic field produced by the rotor-borne magnets.

A traditional stator assembly may be fabricated with a stator core that is formed from thin ferromagnetic discs that are stacked and laminated together into a cylindrical body. Each disc has several openings that, when aligned with the openings of neighboring discs, form stator slots that extend axially through the length of the stator core. Conductive elements, such as metallic rods, bars, windings, etc., are fed through these stator slots and fixed to the stator core. A single stator slot may house several individual conductors, which are arranged one adjacent to another in a radial direction with respect to the stator core in a manner that forms concentric rings of conductors. For radial-flux ACPM motors, the rotor may be circumscribed by the stator with the stator assembly spaced from the rotor assembly by an airgap. Partitioning the radially innermost ends of the stator slots are stator teeth that project towards the outer-diameter (OD) periphery of the rotor assembly. Stator teeth encourage the magnetic flux produced by the stator windings to pass directly across the airgap to the rotor and electromagnetically link with the magnets that are located inside slots of the rotor core before completing the flux path back to the stator assembly.

Presented herein are electric machines with mixtures of bar and wire conductors for producing electromotive forces, methods for manufacturing and methods for operating such machines, and motor vehicles equipped with such machines. By way of example, a motor's efficiency and maximum torque output may be inhibited by excess AC winding losses caused by an electromagnetic winding's ohmic resistance to electrical current. Winding loss—also referred to anachronistically as "copper loss" (irrespective of conductor material)—results in the unwanted dissipation of electrical energy as heat, especially during high-speed motor operation. Motors may suffer additional losses due to winding proximity effect that causes the conductors that are packaged closest to the airgap to suffer uneven current distributions with a concomitant increase in effective resistance at high operating speeds. To mitigate winding loss and effect, disclosed electric machines employ engineered arrangements of conductors of different types, including patterns in which solid-wire or multistrand-wire conductors are packaged in the (innermost) slot layer(s) closest to the rotor-stator airgap, and bar-type or hairpin-type conductors are placed in the (outermost) slot layer(s) furthest from the airgap. Each wire conductor may have a circular (first) cross-section with a reduced (first) area, whereas each bar conductor may have a rectangular (second) cross-section with an enlarged (second) area, which is at least 5×-6× larger than the wire's cross-sectional area. Moreover, the ratio of wire conductors to bar conductors in a given slot may be at least 3:1. These mixed bar-and-wire conductor arrangements help to minimize AC winding loss at high-speed operations while maintaining a high slot fill-factor and reduced DC copper loss at low operating speeds.

Aspects of this disclosure are directed to engineered combinations of wire and bar conductors for electric machines, such as motors, generators, transformers, inductors, dynamometers, converters, etc. For instance, an electric machine includes a protective outer housing, a stator assembly fixedly attached to the housing, and a rotor assembly rotatable with respect to and spaced across an airgap from the stator assembly. A set of magnets, such as permanent magnet (PM) blocks, are mounted to the rotor assembly (or the stator assembly), whereas multiple sets of electromagnetic conductors are fed through slots in the stator assembly (or the rotor assembly). Each set of electromagnetic conductors includes a group of wire conductors, which is located adjacent the airgap, and a group of bar conductors, which is radially spaced from the airgap and located adjacent the wire conductors. Each bar conductor has a cross-sectional area that is markedly larger than a cross-sectional area of each wire conductor.

Additional aspects of this disclosure are directed to electric-drive vehicles with multiphase brushless ACPM traction motors containing both bar and wire conductors. As used herein, the terms "vehicle" and "motor vehicle" may be used interchangeably and synonymously to reference any relevant vehicle platform, such as passenger vehicles (ICE, HEV, FEV, fuel cell, fully and partially autonomous, etc.), commercial vehicles, industrial vehicles, tracked vehicles, off-road and all-terrain vehicles, motorcycles, farm equipment, watercraft, aircraft, e-bikes, etc. In an example, a motor vehicle includes a vehicle body with a passenger compartment, multiple road wheels mounted to the vehicle body (e.g., via corner modules coupled to a unibody or body-on-frame chassis), and other standard original equipment. For electric-drive vehicle applications, the vehicle is equipped with an electrified powertrain that employs one or more traction motor/generator units (MGU), which operate alone (e.g., for FEV powertrains) or in conjunction with an internal combustion engine assembly (e.g., for HEV powertrains), to selectively drive one or more of the road wheels and thereby propel the vehicle.

Continuing with the preceding discussion, the traction motor includes a protective and insulating motor housing, a stator assembly with a stator core fixedly mounted inside the motor housing, and a rotor assembly with a rotor core rotatably mounted inside the motor housing. The stator core contains a series of circumferentially spaced and radially elongated stator slots. Conversely, the rotor assembly is nested inside the stator assembly such that the rotor core is concentric with and spaced across an airgap from the stator core. A set of circumferentially spaced magnets is mounted on or in the rotor core. Multiple sets of electromagnetic conductors are mounted to the stator core with each set extending through a respective one of the stator slots. Each set of electromagnetic conductors includes a set of wire conductors, which is located adjacent the airgap, and a set of bar conductors, which is radially spaced from the airgap and located adjacent the wire conductors. Each wire conductor has a wire-specific (first) cross-sectional area with a wire-specific (first) cross-sectional geometry, and each bar conductor has a bar-specific (second) cross-sectional area, which is larger than the wire's cross-sectional area, and a bar-specific (second) cross-sectional geometry, which is distinct from the wire's cross-sectional geometry.

Aspects of this disclosure are also directed to manufacturing workflow processes, computer-readable media, and control logic for making or for using any of the disclosed electric machines, motor drive systems, and/or motor vehicles. In an example, a method is presented for assembling an electric machine. This representative method includes, in any order and in any combination with any of the above and below disclosed options and features: receiving a housing of the electric machine; attaching a stator to the housing; attaching a rotor to the housing such that the rotor is movable with respect to and spaced across an airgap from the stator; attaching a plurality of magnets to one of the rotor or the stator; and attaching a plurality of electromagnetic conductors to the other of the rotor or the stator, the electromagnetic conductors including a plurality of wire conductors and a plurality of bar conductors, the wire conductors located adjacent the airgap and having a first cross-sectional area, and the bar conductors located adjacent the wire conductors, radially spaced from the airgap, and having a second cross-sectional area larger than the first cross-sectional area.

For any of the disclosed vehicles, methods, and electric machines, each wire conductor may have a wire-specific (first) cross-sectional geometry and each bar conductor may have a bar-specific (second) cross-sectional geometry that is distinct from the wire's cross-sectional geometry. For instance, the wire's cross-sectional geometry may be a simple closed curve (e.g., circular, elliptical, discorectangular, etc.), whereas the bar's cross-sectional geometry may be a rectilinear polygon (e.g., rectangular, square, etc., with pointed or rounded corners). As another option, a ratio of the wire conductors to the bar conductors may be at least about 3:1 (e.g., each stator slot may contain twelve wire conductors and four bar conductors). It may be desirable that each bar's cross-sectional area is at least four-times or, optionally, at least five-times or, in some preferred designs, approximately 6.5-times larger than each wire's cross-sectional area. For at least some applications, the wire conductors are not adhered, wound, or wrapped to each other. Alternatively, each wire and bar conductor may be encased in a respective sheath, a group of wire conductors may be prepackaged in a casing, and/or each set of electromagnetic conductors may be embedded in a non-magnetic filler material.

For any of the disclosed vehicles, methods, and machines, the bar conductors in a given slot may be grouped into a single rectilinear line and spaced radially from each other. In this instance, the wire conductors in that same slot may be grouped into two or more rectilinear lines and spaced both radially and circumferentially from each other. As noted above, the rotor assembly may include a magnet-bearing rotor core, and the stator assembly may include a conductor-bearing stator core that is circumscribed by and coaxial with the rotor core. Radially elongated stator slots, which extend through the stator core, each contains a respective set of electromagnetic conductors with the wire conductors located at a radially inner end of the stator slot and the bar conductors located at a radially outer end of the stator slot. It may be desirable that a slot fill factor of the electromagnetic conductor set in a given stator slot be at least about 0.4. As another option, the wire conductors may extend across about 30% to about 60% of a radial length of the stator slot.

For any of the disclosed vehicles, methods, and electric machines, a wire-dedicated (first) power inverter module (PIM) may be electrically coupled with and operable to control a feed of electric current to the wire conductors (and not the bar conductors), whereas a bar-dedicated (second) PIM may be electrically coupled with and operable to control a feed of electric current to the bar conductors (and not the wire conductors). Alternatively, a set of relay switches and a shared power inverter module may be electrically coupled with and operable to control a feed of electric current to both the wire conductors and the bar conductors. As another option, each wire conductor may take on different form factors, including electrically conductive solid-wire or multistrand-wire constructions (e.g., extruded single-piece wire or stranded Litz wire). In the same vein, each bar conductor may take on different form factors, including hairpin, I-pin, D-pin, and flat bar constructions.

The above summary does not represent every embodiment or every aspect of the present disclosure. Rather, the foregoing summary merely provides a synopsis of some of the novel concepts and features set forth herein. The above features and advantages, and other features and attendant advantages of this disclosure, will be readily apparent from the following Detailed Description of illustrated examples and representative modes for carrying out the disclosure when taken in connection with the accompanying drawings and appended claims. Moreover, this disclosure expressly includes any and all combinations and subcombinations of the elements and features presented above and below.

Figure 1:
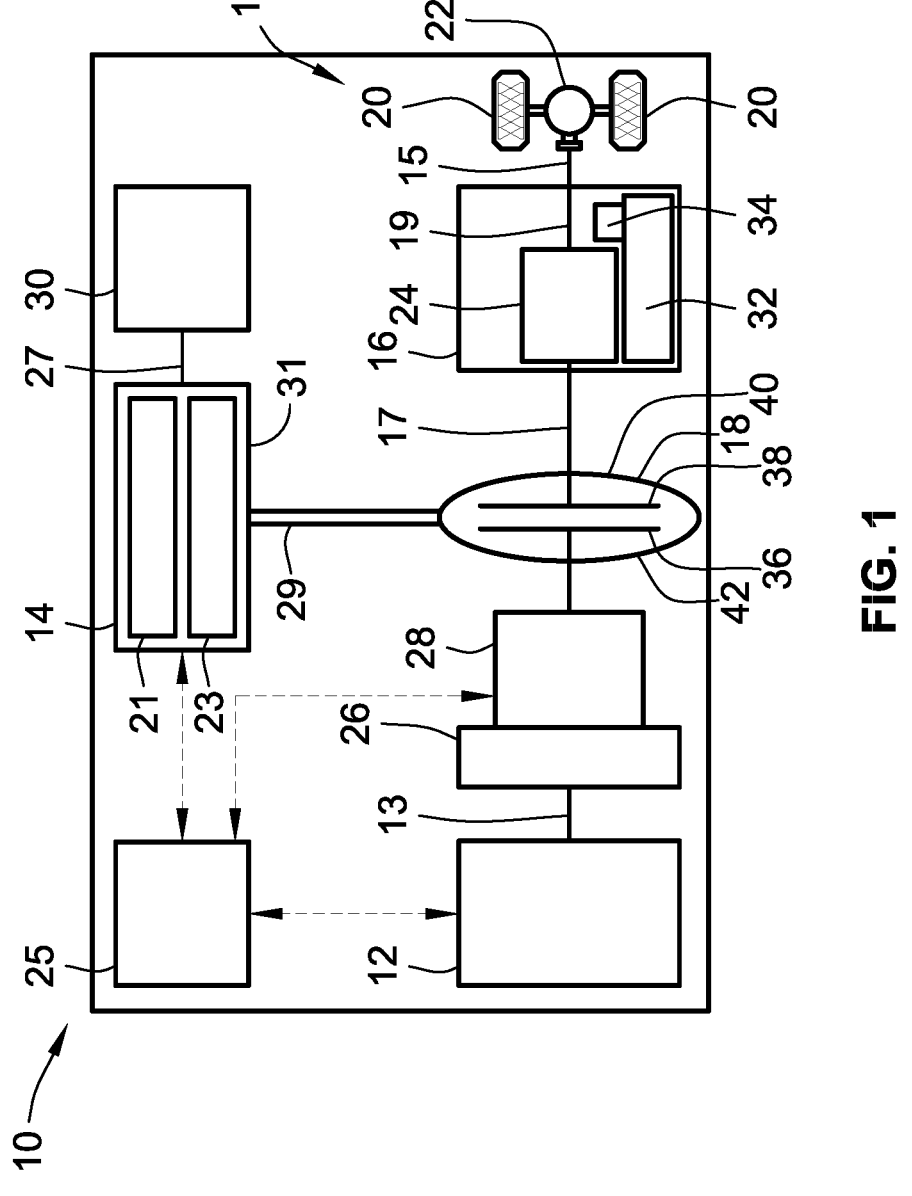
FIG. 1 is a schematic illustration of a representative electric-drive motor vehicle with an electrified powertrain employing an alternating-current, permanent magnet (ACPM) traction motor with which aspects of this disclosure may be practiced.

The present disclosure is amenable to various modifications and alternative forms, and some representative embodiments of the disclosure are shown by way of example in the drawings and will be described in detail herein. It should be understood, however, that the novel aspects of this disclosure are not limited to the particular forms illustrated in the above-enumerated drawings. Rather, this disclosure covers all modifications, equivalents, combinations, permutations, groupings, and alternatives falling within the scope of this disclosure as encompassed, for example, by the appended claims.

DETAILED DESCRIPTION

This disclosure is susceptible of embodiment in many different forms. Representative embodiments of the disclosure are shown in the drawings and will herein be described in detail with the understanding that these embodiments are provided as an exemplification of the disclosed principles, not limitations of the broad aspects of the disclosure. To that extent, elements and limitations that are described, for example, in the Abstract, Introduction, Summary, Description of the Drawings, and Detailed Description sections, but not explicitly set forth in the claims, should not be incorporated into the claims, singly or collectively, by implication, inference or otherwise. Moreover, recitation of "first", "second", "third", etc., in the specification or claims is not per se used to establish a serial or numerical limitation; unless specifically stated otherwise, these designations may be used for ease of reference to similar features in the specification and drawings and to demarcate between similar elements in the claims.

For purposes of this Detailed Description, unless specifically disclaimed: the singular includes the plural and vice versa; the words "and" and "or" shall be both conjunctive and disjunctive; the words "any" and "all" shall both mean "any and all"; and the words "including," "containing," "comprising," "having," and the like, shall each mean "including without limitation." Moreover, words of approximation, such as "about," "almost," "substantially," "generally," "approximately," and the like, may each be used herein to denote "at, near, or nearly at," or "within 0-5% of," or "within acceptable manufacturing tolerances," or any logical combination thereof, for example. Lastly, directional adjectives and adverbs, such as fore, aft, inboard, outboard, starboard, port, vertical, horizontal, upward, downward, front, back, left, right, etc., may be with respect to a motor vehicle, such as a forward driving direction of a motor vehicle when the vehicle is operatively oriented on a horizontal driving surface.

Referring now to the drawings, wherein like reference numbers refer to like features throughout the several views, there is shown in FIG. 1 a schematic illustration of a representative motor vehicle, which is designated generally at 10 and portrayed herein for purposes of discussion as an electric-drive passenger car with a parallel two-clutch (P2) hybrid-electric powertrain. The illustrated automobile 10—also referred to herein as "motor vehicle" or "vehicle" for short—is merely an exemplary application with which aspects of this disclosure may be practiced. In the same vein, incorporation of the present concepts into a hybrid electric powertrain should also be appreciated as a representative implementation of the inventive concepts disclosed herein. As such, it should be understood that novel aspects of this disclosure may be applied to other powertrain architectures, may be incorporated into any logically relevant type of motor vehicle, and may be utilized for both automotive and non-automotive applications alike. Lastly, only select components of the motor vehicles, motor drive systems, and electric machines have been shown and will be described in additional detail below. Nevertheless, the vehicles, systems, and machines discussed herein may include numerous additional and alternative features, and other available peripheral components, for carrying out the various methods and functions of this disclosure.

The electrified vehicle powertrain of FIG. 1 is shown with a prime mover-represented herein by a restartable internal combustion engine (ICE) assembly 12 and an electric motor/generator unit (MGU) 14—that drivingly connects by a multi-speed automatic power transmission 16 to a driveshaft 15 of a final drive system 11. The engine 12 transfers power, typically by way of torque via an engine crankshaft 13, to an input side of the transmission 16. Engine torque is first transmitted via the crankshaft 13 to rotate an engine-driven torsional damper assembly 26; this engine torque is concurrently transferred through the torsional damper assembly 26 to an engine disconnect device 28. The engine disconnect device 28, when operatively engaged, transmits torque received from the ICE assembly 12, by way of the damper 26, to the torque converter (TC) assembly 18. As the name implies, the engine disconnect device 28 may be selectively disengaged to drivingly disconnect the ICE 12 from the motor 14, TC assembly 18, and transmission 16.

To propel the hybrid vehicle 10 of FIG. 1, a multispeed power transmission 16 is adapted to receive, selectively manipulate, and distribute tractive power output from the engine 12 and motor 14 to the vehicle's final drive system 11. The final drive system 11 is represented herein by a driveshaft 15, a rear differential 22, and a pair of rear drive wheels 20. The power transmission 16 and torque converter 18 of FIG. 1 may share a common transmission oil pan or "sump" 32 for supply of hydraulic fluid. A shared transmission pump 34 provides sufficient hydraulic pressure for the fluid to selectively actuate hydraulically activated elements of the transmission 16, the TC assembly 18 and, for some implementations, the engine disconnect device 28.

The ICE assembly 12 operates to propel the vehicle 10 independently of the electric traction motor 14, e.g., in an "engine-only" operating mode, or in cooperation with the motor 14, e.g., in "vehicle-launch" or "motor-boost" operating modes. In the example depicted in FIG. 1, the ICE assembly 12 may be any available or hereafter developed engine, such as a compression-ignited diesel engine or a spark-ignited gasoline or flex-fuel engine, which is readily adapted to provide its available power output typically at a number of revolutions per minute (RPM). Although not explicitly portrayed in FIG. 1, it should be appreciated that the final drive system 11 may take on any available configuration, including front wheel drive (FWD) layouts, rear wheel drive (RWD) layouts, four-wheel drive (4WD) layouts, all-wheel drive (AWD) layouts, six-by-four (6×4) layouts, etc.

FIG. 1 also depicts an electric motor/generator unit ("motor") 14 that operatively connects via a rotor shaft, motor support hub, or belt (collectively motor output member 29) to the hydrodynamic torque converter 18. The torque converter 18, in turn, drivingly connects the motor 14 to an input shaft 17 of the transmission 16. The electric motor/generator unit 14 is composed of an annular stator assembly 21 that circumscribes and is concentric with a cylindrical rotor assembly 23. Electric power is provided to the stator 21 through a high-voltage (HV) electrical system, including electrical rails/cables 27 that pass through the motor housing via suitable sealing and insulating feedthroughs (not illustrated). Conversely, electric power may be provided from the MGU 14 to an onboard traction battery pack 30, e.g., during a regenerative braking mode. Operation of any of the illustrated powertrain components may be governed by an onboard or remote vehicle controller or module or network of controllers/modules/devices, all variations of which are represented in FIG. 1 by a programmable electronic control unit (ECU) 25.

Power transmission 16 may use differential gearing 24 to achieve selectively variable torque and speed ratios between transmission input and output shafts 17 and 19, respectively. One form of differential gearing is the epicyclic planetary gear arrangement, which offers the advantage of compactness and different torque and speed ratios among members of the planetary gearing. Traditionally, hydraulically actuated torque establishing devices, such as clutches and brakes, are selectively engageable to activate the aforementioned gear elements for establishing desired forward and reverse speed ratios between the transmission's input and output shafts 17, 19. While envisioned as a 6-speed or 8-speed automatic transmission, the power transmission 16 may optionally take on other functionally appropriate configurations, including Continuously Variable Transmission (CVT) architectures, manual or automated-manual transmissions, etc.

Hydrodynamic torque converter assembly 18 operates as a fluid coupling for operatively connecting the engine 12 and motor 14 with the internal epicyclic gearing 24 of the power transmission 16. Disposed within an internal fluid chamber of the torque converter assembly 18 is a bladed impeller 36 facing a bladed turbine 38. The impeller 36 is juxtaposed in serial power-flow fluid communication with the turbine 38, with a TC stator (not shown) interposed between the impeller 36 and turbine 38 to selectively alter fluid flow therebetween. The transfer of torque from the engine and motor output members 13, 29 to the transmission 16 via the TC assembly 18 may be through stirring excitation of hydraulic fluid, such as transmission oil, inside the TC's internal fluid chamber caused by rotation of the impeller and turbine 36, 38 blades. To protect these components, the torque converter assembly 18 is constructed with a TC pump housing, defined principally by a transmission-side pump shell 40 that is fixedly attached to an engine-side pump cover 42 such that a working hydraulic fluid chamber is formed therebetween.

Figure 2:
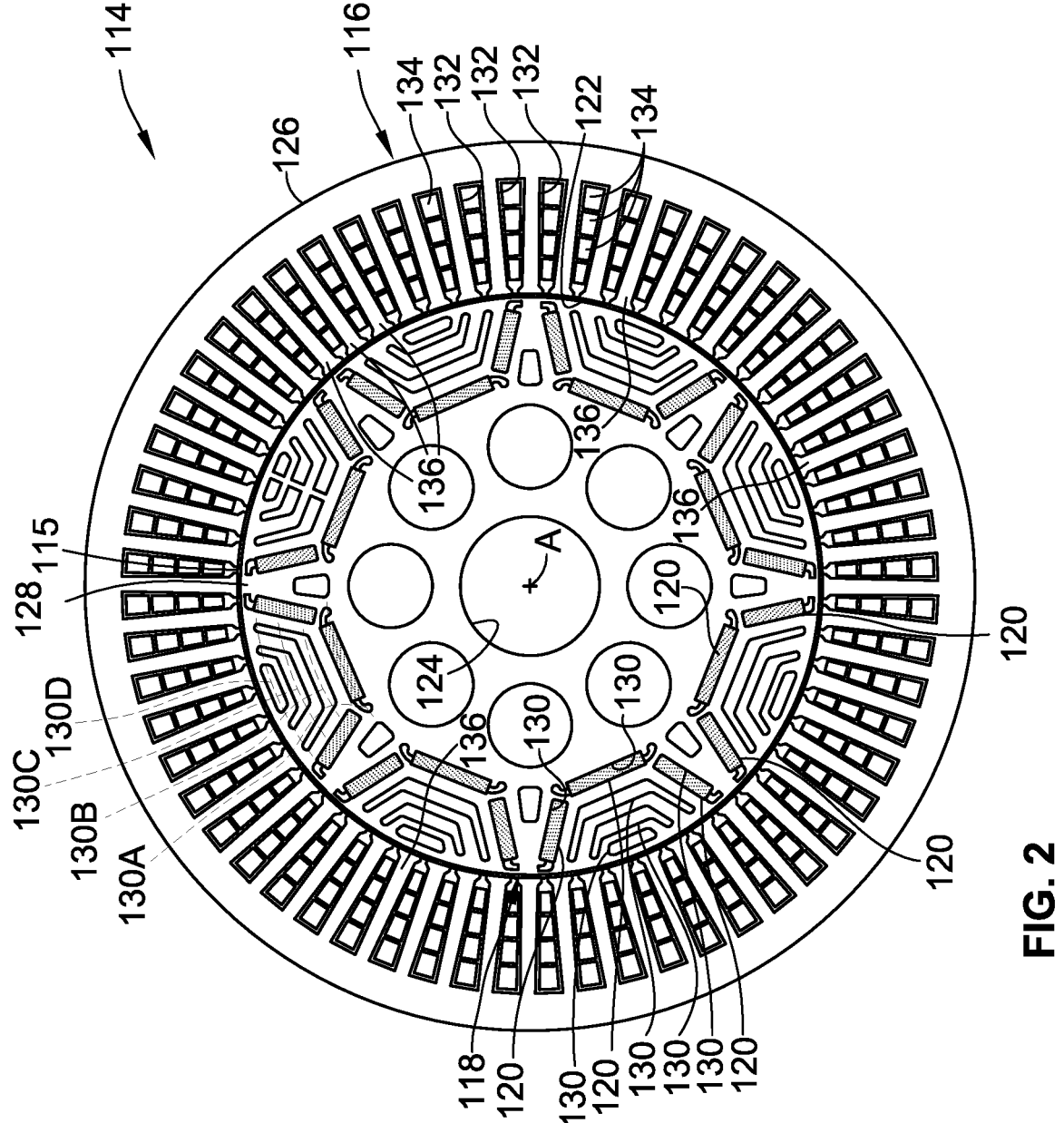
FIG. 2 is an end-view illustration of a representative interior permanent magnet (IPM) electric machine employing a conductor-bearing stator and a magnet-bearing rotor with which aspects of this disclosure may be practiced.

FIG. 2 illustrates an example of an electric machine 114 that employs persistent-state magnetic materials that exchange electromagnetic forces with electrically conductive windings to convert electrical energy into mechanical energy, and vice versa. The electric machine 114 has a multiphase, conductor-wound stator assembly 116 that nests therein and circumscribes a magnet-bearing synchronous reluctance rotor assembly 118. While available for use in automotive and non-automotive applications alike, the electric machine 114 of FIG. 2 may be particularly suited for use in a hybrid-electric powertrain as a traction motor (e.g., motor 14 FIG. 1) with an engine (e.g., ICE assembly 12), and to operate in at least an engine-cranking mode, a regenerative-charging mode, and a torque-assist mode. Electric machine 114 may be designed to achieve: a relatively high efficiency (e.g., at least 85% efficiency over a calibrated output power and speed range); a relatively high power density (e.g., greater than 1500 watts per liter) and torque density (e.g., greater than 5 Newton-meters per liter); a relatively wide peak power range (e.g., four to six kilowatts or greater); a high maximum speed (e.g., at least 18,000 rpm); a reduced mass and inertia (e.g., for fast dynamic response to user output demands); and to fit into a relatively small packaging space. Innumerable alternative architectures may be employed by the electric machine 114 to meet similar and alternative operating parameters.

With continuing reference to FIG. 2, the stator assembly 116 is coaxial with and surrounds the rotor assembly 118 while maintaining a small airgap 115 therebetween. In accord with the illustrated example, this airgap 115 may be about 0.2 millimeters (mm) to about 1.2 mm, for example, in order to maximize power output and minimize the number of permanent magnets 120 borne by the rotor assembly 118 to provide a desired power output. The representative stator and rotor assemblies 116, 118 of FIG. 2 are concentrically aligned about a shared longitudinal center axis A of the electric machine 114. The stator assembly 116 has an annular stator core 126 with a central bore 122 that nests therein the rotor assembly 118. The rotor assembly 118 has a cylindrical rotor core 128, e.g., that keys, splines, welds, etc., to an output shaft (e.g., motor output member 29 of FIG. 1). It should be appreciated that a protective and insulating outer housing (e.g., motor housing 31 in FIG. 1) may surround an outer periphery of the stator assembly 116 and can rotatably support the rotor and rotor output shaft of the electric machine 114.

Rotor assembly 118 of FIG. 2 is fabricated with a rotor core 128, which may have a right-circular cylinder geometry with a toroidal shape, for supporting multiple permanent magnets 120 (twenty-four (24) PMs in the illustrated example) that are circumferentially spaced around a central bore 124. Specifically, the rotor core 128 may be stamped, precision machined, and assembled with multiple rotor slots 130 arranged in radially spaced barrier layers (e.g., four distinct barrier layers). A first barrier layer 130A of slots 130 may be positioned closest to an inner periphery of the rotor core 128, while a fourth barrier layer 130D of slots 130 may be positioned furthest from the rotor body's inner periphery than the other barrier layers. A second barrier layer 130B may be radially interposed between the first and third barrier layers 130A, 130C, while a third barrier layer 130C may be radially interposed between the second and fourth barrier layers 130B, 130D. For at least some embodiments, only select barrier layers (e.g., the first and third barrier layers 130A, 130C) may house magnets 120, while other select barrier layers (e.g., the second and fourth barrier layers 130B, 130D) do not house magnets 120 and, thus, act as flux barriers. In other embodiments, only one or all of the barrier layers may comprise slots storing therein permanent magnets. The rotor core 128 may be fabricated from metallic disc-shaped laminates, including high-grade steel blanks, that are stacked and adhered together to maintain high-speed rotational stress within predetermined limits.

Stator assembly 116 of FIG. 2 is fabricated with a stator core 126, which may also have a right-circular cylinder geometry with a generally annular shape and may have multiple circumferentially spaced, radially elongated stator slots 132 (e.g., 60 total slots in the illustrated example). Each stator slot 132 extends axially through the stator core 126, parallel to the rotational axis A of the electric machine 114. These stator slots 132 house electrically conductive, multiphase electromagnetic stator windings 134. Stator windings 134—also referred to herein as "wire windings" or "bar windings"—may be grouped into different sets, each of which may carry an identical number of phases of electrical current, such as three, five, six, or seven phases. In addition, the stator windings 134 may extend axially beyond open longitudinal ends of the stator core 126. A ratio of an outer diameter of the stator core 126 to an axial length of the stator core 126 may be not less than 1.5 and not greater than 3.5, for example, to satisfy packing space constraints for a desired application of the electric machine 114, such as the vehicle powertrain of FIG. 1.

For ease of manufacture and simplicity of design, it may be desirable that all of the permanent magnets 120 share an identical, rectangular polyhedron shape. Nevertheless, any one or more or all of the PM bodies may take on innumerable shapes and sizes, including other polyhedral block-type magnets, ring-shaped (annular) magnets, bread-loaf block-type magnets, curved tile magnets, etc. In a non-limiting example, each permanent magnet 120 may have a thickness of about 1.5 mm to 2.5 mm to fit within a slot 130 having complementary dimensions. A total mass of magnet material used by the electric machine 114 (i.e., the mass of all magnets 120) may be about 150 grams to about 250 grams. The permanent magnets 120 of the electric machine 114 may all be fabricated from the same material, such as Neodymium Iron Boron (NdFeB); alternatively, the magnets 120 may employ different materials, such as Samarium Cobalt (SmCo), Aluminum Nickel Cobalt (AlNiCo), or any combination of rare earth magnet materials.

Unlike the permanent magnets 120, it may be desirable that the multiphase stator windings 134 of FIG. 2 be composed of a mixture of differently shaped and sized electromagnetic conductors. As described in extensive below in the discussion of FIG. 3, the stator windings 134 may include both bar-type conductors, such as U-shaped hairpin windings, and wire-type conductors, such as copper wire windings. The legs of the hairpin windings may be inserted into the slots 132 of the stator core 126, with each leg extending through a different stator slot 132 such that the hairpin crown (or "end-turn") extends over several of the stator slots 132 (e.g., each crown may extend across three or more slots). These hairpin windings 134 may be inserted in a "staggered" or "interleaved" pattern with respect to adjacent hairpins. Any given stator slot 132 may contain a number of hairpin legs (e.g., four to eight) and a number of segments of individual wire windings (e.g., 8 to 24). Once all of the electromagnetic windings 134 are inserted into the slots 132 of the stator core 126, the ends of the windings projecting from a longitudinal end of the stator core 126 may be bent. Electrical connections are then made to each winding 134.

During operation of the electric machine 114, e.g., in a regenerative-charging mode, the rotor assembly 118 is rotated via the rotor output shaft while the stator assembly 116 is held relatively stationary. In so doing, the permanent magnets 120 are moved past the multiphase stator windings 134; the magnetic field emitted by the permanent magnets 120 generates an electrical current in the windings 134 through electromagnetic induction. This induced electric current may be used to power a load (e.g., recharge traction battery pack 30 of FIG. 1). Conversely, during operation of the electric machine 114, e.g., in an engine-cranking mode, an EV motoring mode, or a torque-assist mode, an electric current is supplied to the stator windings 134 by a suitable power source (e.g., traction battery pack 30). Passing the supplied current through the multiphase stator windings 134 will generate a magnetic field at radially inward ends of stator teeth 136. The magnetic field output from these stator teeth 136 interacts with the permanent magnets 120 in the rotor assembly 118 such that the rotor core 128 and attached shaft rotate in unison to generate a rotational driving force.

PM traction motors may suffer from high copper loss and high AC winding (proximity/skin) effect while operating at high speeds, which may result in high motor operating temperatures and reduced torque output. Electromagnetic conductors closest to the rotor-stator airgap are more affected by winding loss and effect during high motor speeds. To mitigate such AC winding loss and effect, solid-wire or multistrand-wire conductors with reduced cross-sections are placed in the slot layers closest to the airgap. Hairpin, I-pin, or other bar conductors with larger cross-sections are placed at the slot layers furthest from the airgap to increase the slot fill-factor and lower DC winding loss. For at least some operating points of high motor speed and torque (e.g., 9000+ RPM, 400+Nm), there is a significant improvement in motor efficiency with this engineered combination of wire and bar conductors (e.g., about 30%); higher speeds (e.g., 18,000+ RPM) may achieve even higher efficiency improvements (e.g., about 50%).

Figure 3:
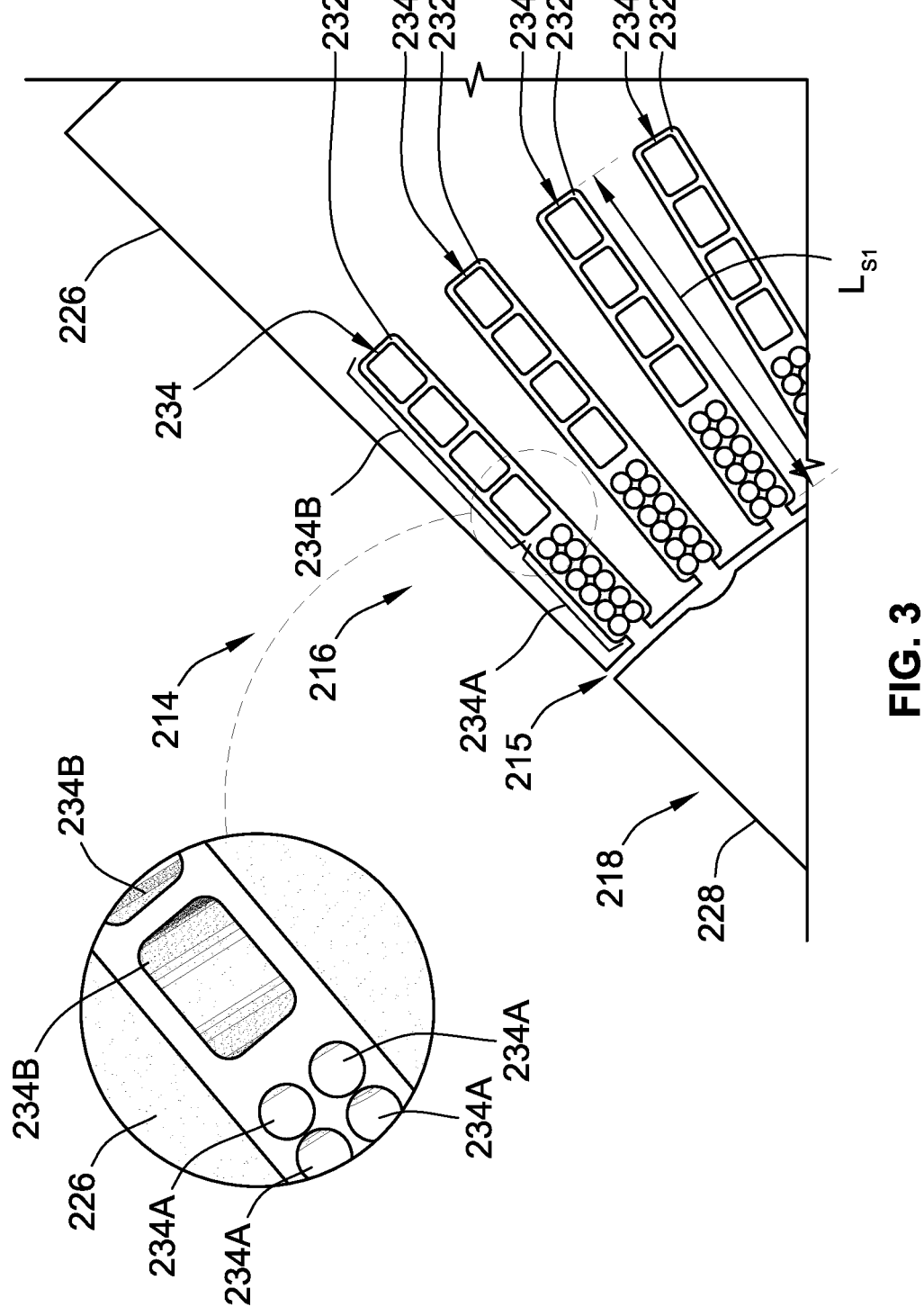
FIG. 3 is an enlarged illustration of a portion of a representative rotor assembly and a representative stator assembly having engineered combinations of both wire and bar conductors for providing reduced proximity effect and AC winding loss, e.g., for the MGU of FIG. 1 or the ACPM machine of FIG. 2, in accord with aspects of the present disclosure.

Turning next to FIG. 3, there is shown an example of an electric machine 214 employing a mixed bar-and-wire conductor arrangement to reduce AC winding loss at high-speed operations and reduce DC copper loss at low operating speeds. Although differing in appearance, it is envisioned that any of the features and options described above with reference to the traction motor/generator unit 14 of FIG. 1 and the multiphase ACPM electric machine 114 of FIG. 2 can be incorporated, singly or in any combination, into the radial-flux electric machine 214 of FIG. 3, and vice versa. As a non-limiting point of overlap, the electric machine 214 contains a conductor-bearing stator assembly 216 that is coaxially aligned with and separated by an airgap 215 from a magnet-bearing rotor assembly 218. Similar to the stator assembly 116 of FIG. 2, stator assembly 216 of FIG. 3 is constructed with a flux-permeable annular stator core 226 having multiple circumferentially spaced stator slots 232 that are aligned radially with and extend axially through the core 226. Similar to the rotor assembly 118 of FIG. 2, the rotor assembly 218 of FIG. 3 is constructed with a stacked-laminate cylindrical rotor core 228 that mounts thereon or therein a series of circumferentially spaced permanent magnets.

Wound through each axially elongated slot 232 of the stator core 226 is a respective set of electromagnetic conductors 234, with each set containing a mixture of both wire-type conductors 234A and bar-type conductors 234B. In accord with the illustrated example, each conductor set 234 includes a subset of electric wire conductors 234A that is clustered into a distinct (first) group; this wire group is located adjacent the airgap 215 and isolated to a proximal section of the slot 232 closest to the airgap 215. Each conductor set 234 also includes a subset of bar conductors 234B that is clustered into a distinct (second) group; this bar group is located adjacent the wire conductors 234A, radially spaced from the airgap 215, and isolated to a distal section of the slot 232 furthest from to the airgap 215. The wire conductors 234A may take on a variety of different form factors, including electrically conductive solid-wire constructions (e.g., extruded single-piece copper wires) or multistrand-wire constructions (e.g., individually insulated copper strand "Litz" wires). In the same vein, the bar conductors 234B may take on a variety of different form factors, including hairpin, I-pin, D-pin, and flat bar constructions (e.g., each precision formed as single-piece constructions from copper, steel, aluminum, etc.). While illustrated with two different sized/shaped conductors, it is envisioned that the electric machine 214 may contain three or more different sized/shaped conductors.

To optimize packaging space and machine operation, the wire conductors 234A may be grouped into multiple rectilinear lines (e.g., arranged in a rectangular array of mutually parallel rows and mutually parallel columns) and may be spaced from each other within the slot 232 (e.g., separated both radially and circumferentially with respect to the stator core 226), as best seen in the inset view of FIG. 3. Likewise, the bar conductors 234B may be grouped into a single rectilinear line (e.g., arranged single file in a straight row) and spaced from each other (e.g., separated radially with respect to the stator core 226). It may be desirable that a ratio of the wire conductors 234A to the bar conductors 234B is at least about 2:1 or, for at least some configurations, at least about 3:1 (e.g., each stator slot 232 is shown containing twelve wire conductors 234A and four bar conductors 234B). As shown, the wire conductors 234A are not adhered, wound, or wrapped to each other or to the bar conductors 234B and, thus, are loosely fit within the slot 232 (i.e., packaged with sufficient clearance to permit free play). Alternatively, each wire conductor 234A may be encased in a respective insulating sheath, each group of the wire conductors 234A may be prepackaged in a shared casing, and/or each set of electromagnetic conductors 234 may be embedded in a non-magnetic filler material.

In order to minimize AC winding loss at high-speed machine operating points and minimize DC copper loss at low-speed machine operating points, all of the wire conductors 234A in a given group 234 may be located at a radially inner end of that group's respective stator slot 232 (i.e., in the lower/proximal half of the slot) and all of the bar conductors 234B in that group 234 may be located at a radially outer end of the stator slot (i.e., in the upper/distal half of the slot). Moreover, the wire conductors 234A may extend across about 20-65% or, in at least some implementations, at least about 30%, but no mora than about 60%, of a radial slot length $L_{S1}$ of each stator slot 232. As shown, all twelve wire conductors 234A are restricted to and extend across the radially inner one-third of the stator slot 232, while all four of the bar conductors 234B are restricted to and extend across the radially outer two-thirds of the stator slot 232.

For at least some applications, it may be desirable that a slot fill factor (SFF) of each set of electromagnetic conductors 234 and its respective stator slot 232 is about 0.35-0.95 or, in at least some preferred implementations, at least about 0.4. As used herein, the term "slot fill factor" may be given its ordinary and customary meaning, such as the mathematical ratio of the sum of the cross-sectional areas of the electrically conductive material of the conductors to the total cross-sectional area of the slot. In FIG. 3, the total cross-sectional area of the copper material of each group of electromagnetic conductors 234 occupies approximately 67% of the cross-sectional area of the slot 232 occupied by those conductors (SFF≈0.67).

With continuing reference to FIG. 3, each wire conductor 234A has a wire-specific (first) cross-sectional area that is markedly smaller than a bar-specific (second) cross-sectional area of each bar conductor 234B. It may be desirable, for example, that each bar conductor's cross-sectional area is at least four-times or, optionally, at least five-times larger than each wire's cross-sectional area. As shown, the transverse cross-section of a bar-type conductor 234B has a total area that is approximately 6.6-times larger than a total area of the transverse cross-section of a wire-type conductor 234A. According to the representative electric machine 214 design of FIG. 3, the wire conductors 234A have a wire-specific (first) cross-sectional geometry that is distinct from a bar-specific (second) cross-sectional geometry of the bar conductors 234B. For instance, the transverse cross-section of a wire-type conductor 234A may have a simple closed curve shape (e.g., circular, elliptical, discorectangular, etc.). Comparatively, the transverse cross-section of a bar-type conductor 234B may have a rectilinear polygon shape (e.g., rectangular, square, etc., with pointed or rounded corners). It is envisioned that the wire and bar conductors 234A, 234B may take on alternative regular and irregular shapes and sizes from that which are shown in the drawings, and may share a similar geometry without departing from the intended scope of this disclosure.

Figures 4, 5:
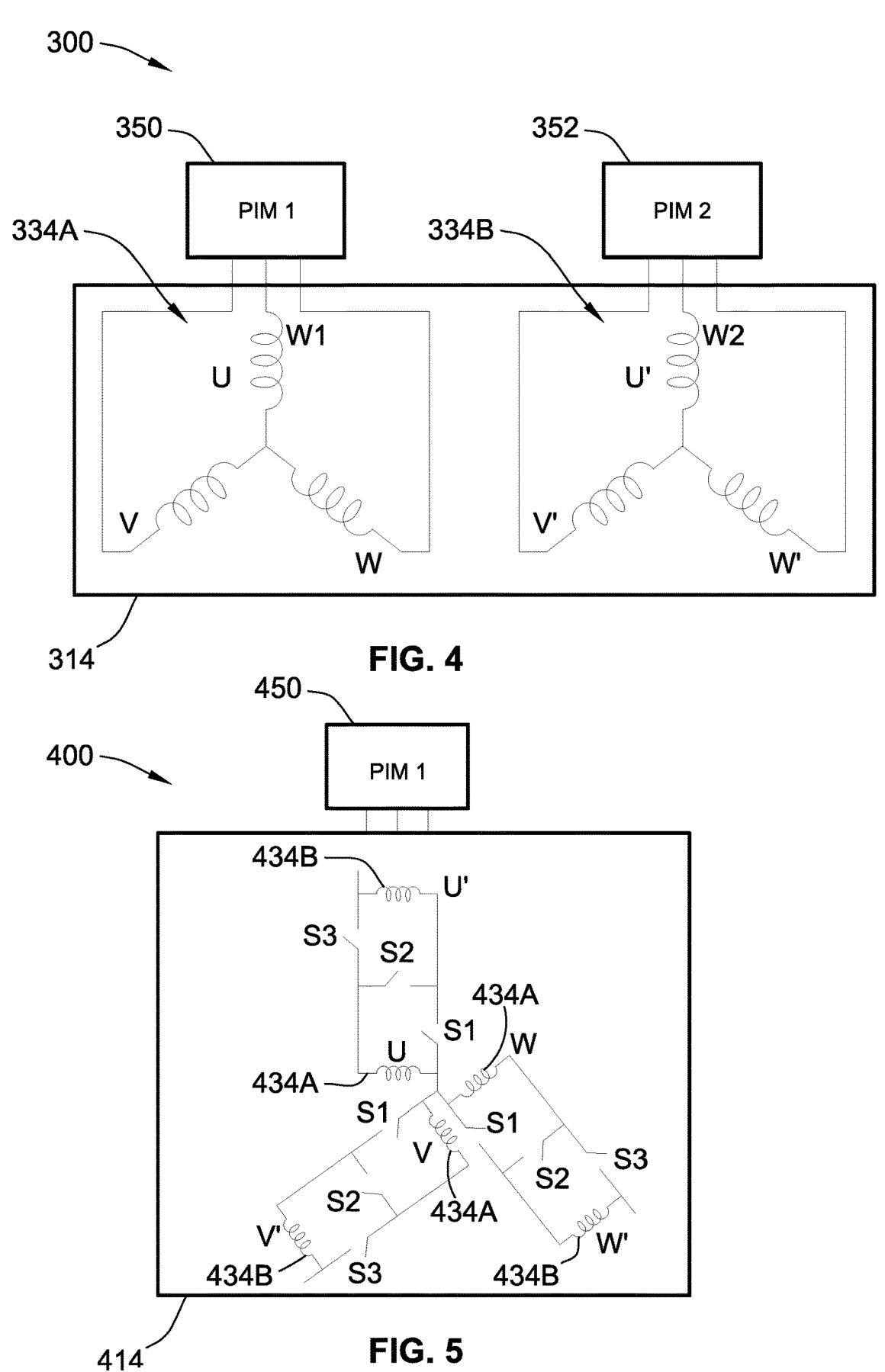
FIG. 4 is a schematic one-line diagram illustrating a representative motor drive system with a dedicated PIM for governing the flow of electric power to a group of wire conductors and a dedicated PIM for governing the flow of electric power to a group of bar conductors in a mixed bar-and-wire motor in accord with aspects of the present disclosure.
FIG. 5 is a schematic one-line diagram illustrating a representative motor drive system with a set of relay switches and a shared power inverter module for governing the flow of electric power to a group of wire conductors and a group of bar conductors in a mixed bar-and-wire motor in accord with aspects of the present disclosure.

To optimize the copper loss characteristics of a mixed bar-and-wire electric machine, such as electric machine 214 of FIG. 3, the high-voltage electrical system regulating the transfer of electricity to and from the machine may employ multiple power inverters, at least one of which is dedicated to control operation of the wire conductors and at least one of which is dedicated to control operation of the bar conductors. FIG. 5, for example, illustrates an example of a motor drive system 300 with an electric motor 314, a first power inverter module (PIM1) 350 that is electrically coupled to a subset of stator-borne wire conductors 334A within the motor 314, and a second PIM 352 that is electrically coupled to a subset of stator-borne bar conductors 334B within the motor 314. In this example, the first PIM1 350 is selectively operable (e.g., via a motor control module (MCM) communicatively connected to ECU 25 of FIG. 1) to independently govern a feed of electric current to the wire conductors 334A (and not the bar conductors 334B). The second PIM2 352, in contrast, is selectively operable (e.g., via MCM and ECU control) to independently govern a feed of electric current to the bar conductors 334B (and not the wire conductors 334A). During operation of the electric motor 314, for example, the wire-type conductors 334A located nearest to the rotor-stator airgap are fed electric power from the first PIM1 350 during high-speed operations, while the bar-type conductors 334B located furthest from the airgap are active at lower speeds via a feed of electric power from the second PIM2 352.

As another option for optimizing the copper loss characteristics of a mixed bar—and—wire electric machine, such as electric machine 214 of FIG. 3, the HV electrical system may employ electromechanical switches (e.g., relays) and/or electronic switches (e.g., insulated-gate bipolar transistor (IGBT) semiconductor switches) that operate in unison with a solitary power inverter to independently and collectively control operation of the bar and wire conductors. FIG. 5, for example, illustrates an example of a motor drive system 400 with an electric motor 414, a subset of stator-borne wire conductors 434A and a subset of stator-borne bar conductors 434B within the motor 414, a shared power inverter module (PIM1) 450 that is electrically coupled to both the wire and bar conductors 434A, 434B, and electrical switches S1-S3 interposed between and selectively interconnecting the wire and bar conductors 434A, 434B to the shared PIM 450. During operation of the electric motor 414, the PIM 450 may transmit a flow of electric power to only the wire-type conductors 434A, to only the bar-type conductors 434B, or to both sets of conductors 434A, 434B in-series.

Discussed above are a variety of new electromagnetic conductor arrangements for electric machines that help to reduce copper loss, mitigate winding effect, and improve thermal operating characteristics. For example, solid-wire or strand—wire conductors are located in slot layers adjacent the rotor-stator airgap while hairpin-type or I-pin-type bar conductors are located at slot layers radially farthest from the airgap. Placing small-gauge wire conductors near the airgap helps to reduce AC winding effect and winding loss at high operating speeds. Conversely, larger-gauge hairpin/bar conductors spaced from the airgap help to ensure a high slot fill-factor with reduced DC winding losses. In non-limiting examples, at least about 40% to about 60% of available conductor slot area may be occupied with wire conductors, and the remaining 40%~60% of slot area may be occupied by bar conductors. Disclosed motor drive systems may employ a single inverter or multiple inverters to govern the feed of electrical power to/from the mixed-conductor motors. For instance, wire-type conductors packaged near the airgap may be fed from one inverter during high speed operation, while the larger bar-type conductors are only active through another inverter at lower speeds.

Aspects of the present disclosure have been described in detail with reference to the illustrated embodiments; those skilled in the art will recognize, however, that many modifications may be made thereto without departing from the scope of the present disclosure. The present disclosure is not limited to the precise construction and compositions disclosed herein; any and all modifications, changes, and variations apparent from the foregoing descriptions are within the scope of the disclosure as defined by the appended claims. Moreover, the present concepts expressly include any and all combinations and subcombinations of the preceding elements and features.

What is claimed:

1. An electric machine, comprising:
   a housing;
   a stator attached to the housing;
   a rotor movable with respect to and spaced across an airgap from the stator;
   a plurality of magnets attached to one of the rotor or the stator; and
   a plurality of electromagnetic conductors attached to the other of the rotor or the stator, the electromagnetic conductors including a plurality of wire conductors and a plurality of bar conductors, the wire conductors located adjacent the airgap and each having a first cross-sectional area, and the bar conductors radially spaced from the airgap, located adjacent the wire conductors, and each having a second cross-sectional area larger than the first cross-sectional area,
   wherein the bar conductors are grouped into a single rectilinear line and spaced from each other, and
   wherein the wire conductors are grouped into multiple rectilinear lines and spaced from each other.

2. The electric machine of claim 1, wherein a ratio of the wire conductors to the bar conductors is at least about 3:1.

3. The electric machine of claim 1, wherein the second cross-sectional area is at least five-times larger than the first cross-sectional area.

4. The electric machine of claim 1, further comprising a first power inverter module (PIM) electrically coupled with and configured to control a feed of electric current to the wire conductors and not the bar conductors, and a second PIM electrically coupled with and configured to control a feed of electric current to the bar conductors and not the wire conductors.

5. The electric machine of claim 1, further comprising a plurality of relay switches and a shared power inverter module (PIM) both electrically coupled with and configured to control a feed of electric current to both the wire conductors and the bar conductors.

6. The electric machine of claim 1, wherein the wire conductors include solid-wire conductors and/or multistrand-wire conductors, and the bar conductors include I-pin conductors, D-pin conductors, flat-bar conductors, and/or hairpin conductors.

7. The electric machine of claim 1, wherein each of the wire conductors has a first cross-sectional geometry and the bar conductors each has a second cross-sectional geometry distinct from the first cross-sectional geometry.

8. The electric machine of claim 7, wherein the first cross-sectional geometry is a simple closed curve, and the second cross-sectional geometry is a rectilinear, beveled, or rounded polygon.

9. The electric machine of claim 1, wherein the rotor includes a rotor core bearing the magnets, and the stator includes a stator core coaxial with and circumscribing the rotor core, the stator core defining a radially elongated stator slot containing the electromagnetic conductors with the wire conductors located at a radially inner end of the stator slot and the bar conductors located at a radially outer end of the stator slot.

10. The electric machine of claim 9, wherein a slot fill factor of the electromagnetic conductors and the stator slot is at least about 0.4.

11. The electric machine of claim 9, wherein the wire conductors extend across about 30% to about 60% of a radial length of the stator slot.

12. A method of assembling an electric machine, the method comprising:

receiving a housing of the electric machine;

attaching a stator to the housing;

attaching a rotor to the housing such that the rotor is movable with respect to and spaced across an airgap from the stator;

attaching a plurality of magnets to one of the rotor or the stator; and attaching a plurality of electromagnetic conductors to the other of the rotor or the stator, the electromagnetic conductors including a plurality of wire conductors and a plurality of bar conductors, the wire conductors located adjacent the airgap and each having a first cross-sectional area, and the bar conductors located adjacent the wire conductors, radially spaced from the airgap, and each having a second cross-sectional area larger than the first cross-sectional area, wherein the bar conductors are grouped into a single rectilinear line and spaced from each other, and wherein the wire conductors are grouped into multiple rectilinear lines and spaced from each other.

13. The method of claim 12, wherein the wire conductors have a first cross-sectional geometry and the bar conductors have a second cross-sectional geometry distinct from the first cross-sectional geometry.

14. The method of claim 12, wherein a ratio of the wire conductors to the bar conductors is at least about 3:1.

15. The method of claim 12, wherein the second cross-sectional area is at least five-times larger than the first cross-sectional area.

16. The method of claim 12, further comprising:

connecting a first power inverter module (PIM) to the wire conductors and not the bar conductors, the first PIM configured to control a first feed of electric current to the wire conductors; and connecting a second PIM to the bar conductors and not the wire conductors, the second PIM configured to control a second feed of electric current to the bar conductors.

17. The method of claim 12, wherein the wire conductors include solid-wire conductors and/or multistrand-wire conductors, and the bar conductors include I-pin conductors, D-pin conductors, flat-bar conductors, and/or hairpin conductors.

18. The method of claim 12, wherein the rotor includes a rotor core bearing the magnets, and the stator includes a stator core coaxial with and circumscribing the rotor core, the stator core defining a radially elongated stator slot containing the electromagnetic conductors with the wire conductors located at a radially inner end of the stator slot and the bar conductors located at a radially outer end of the stator slot.

19. The method of claim 18, wherein a slot fill factor of the electromagnetic conductors and the stator slot is at least about 0.4, and wherein the wire conductors extend across about 30% to about 60% of a radial length of the stator slot.

20. An electric machine, comprising:

a housing;

a stator attached to the housing;

a rotor movable with respect to and spaced across an airgap from the stator;

a plurality of magnets attached to one of the rotor or the stator;

a plurality of electromagnetic conductors attached to the other of the rotor or the stator, the electromagnetic conductors including a plurality of wire conductors and a plurality of bar conductors, the wire conductors located adjacent the airgap and each having a first cross-sectional area, and the bar conductors located adjacent the wire conductors, radially spaced from the airgap, and each having a second cross-sectional area larger than the first cross-sectional area;

a first power inverter module (PIM) electrically coupled with and configured to control a feed of electric current to the wire conductors and not the bar conductors; and a second PIM electrically coupled with and configured to control a feed of electric current to the bar conductors and not the wire conductors.

* * * * *